United States Patent [19]

Nakajima

[11] 4,157,552
[45] Jun. 5, 1979

[54] PEN HOLDING DEVICE FOR AN AUTOMATIC DRAFTING DEVICE

[75] Inventor: Hiroyuki Nakajima, Tokyo, Japan

[73] Assignee: Kabushiki Kaisha Daini Seikosha, Japan

[21] Appl. No.: 801,416

[22] Filed: May 27, 1977

[30] Foreign Application Priority Data

May 27, 1976 [JP] Japan .............................. 51-68123[U]

[51] Int. Cl.² ........................................... G01D 15/16
[52] U.S. Cl. .................................... 346/141; 33/18 R
[58] Field of Search ........................... 346/141, 140 R; 33/18 R

[56] References Cited

U.S. PATENT DOCUMENTS

| | | | |
|---|---|---|---|
| 3,401,401 | 9/1968 | Read | 346/141 X |
| 3,550,276 | 12/1970 | Kramer | 33/18 R |
| 3,686,681 | 8/1972 | Stegena | 346/141 |

Primary Examiner—Joseph W. Hartary
Attorney, Agent, or Firm—Robert E. Burns; Emmanuel J. Lobato; Bruce L. Adams

[57] ABSTRACT

A pen holding device has a pen or pens slidable in a pen holder which is fixed removably to a drafting head frame. The pens are moved up and down by actuating means mounted on the drafting head frame, for drafting and mooring. The engagement of the actuating means to the pens are very easily released by a single releasing mechanism for easy and quick exchange of the pens.

4 Claims, 3 Drawing Figures

PEN HOLDING DEVICE FOR AN AUTOMATIC DRAFTING DEVICE

BACKGROUND OF THE INVENTION

This invention relates to a pen holding device for an automatic drafting device, and particularly to a pen holding device in which a pen holder is removably fixed to a drafting head frame, the holder has a pen or a plurality of pens engageable with the corresponding actuating means provided in the drafting head frame and disengageable for release from the pen holder, and a single lever shaft serves to disengage all of the pens from their actuating means.

In conventional drafting devices, the drafting head has a pen holder therein in a body and the pen is mounted in the pen holder with a bayonet connection, in which a pen is pushed in against spring force and is turned to be fixed.

In this connection, the pen often damages the sheet and itself because of the pen hitting against the sheet in the setting operation with pushing action. If the drafting head is held higher over the sheet, the setting or releasing of the pen accompanies no damages described above but the operation becomes troublesome in the gap adjustment of the pen to the sheet at every setting operation.

BRIEF SUMMARY OF THE INVENTION

Therefore, it is an object of the present invention to provide a pen holding device with which it is easy to set or release pens with a simple operation and to exchange them quickly and correctly, preventing pens and sheet from damage which would be caused by their hitting.

This and other objects are attained by a pen holding device which provides a holder case removable from the drafting head frame and supporting a pen or a plurality of pens slidable therein in their longitudinal directions, and actuating means engageable with the pens to move up and down.

BRIEF DESCRIPTION OF THE DRAWINGS

The drawings show an embodiment of the pen holding device according to the invention, in which.

DESCRIPTION OF PREFERRED EMBODIMENT

Now, an embodiment of this invention will be described referring to the attached drawings.

Figure 1:
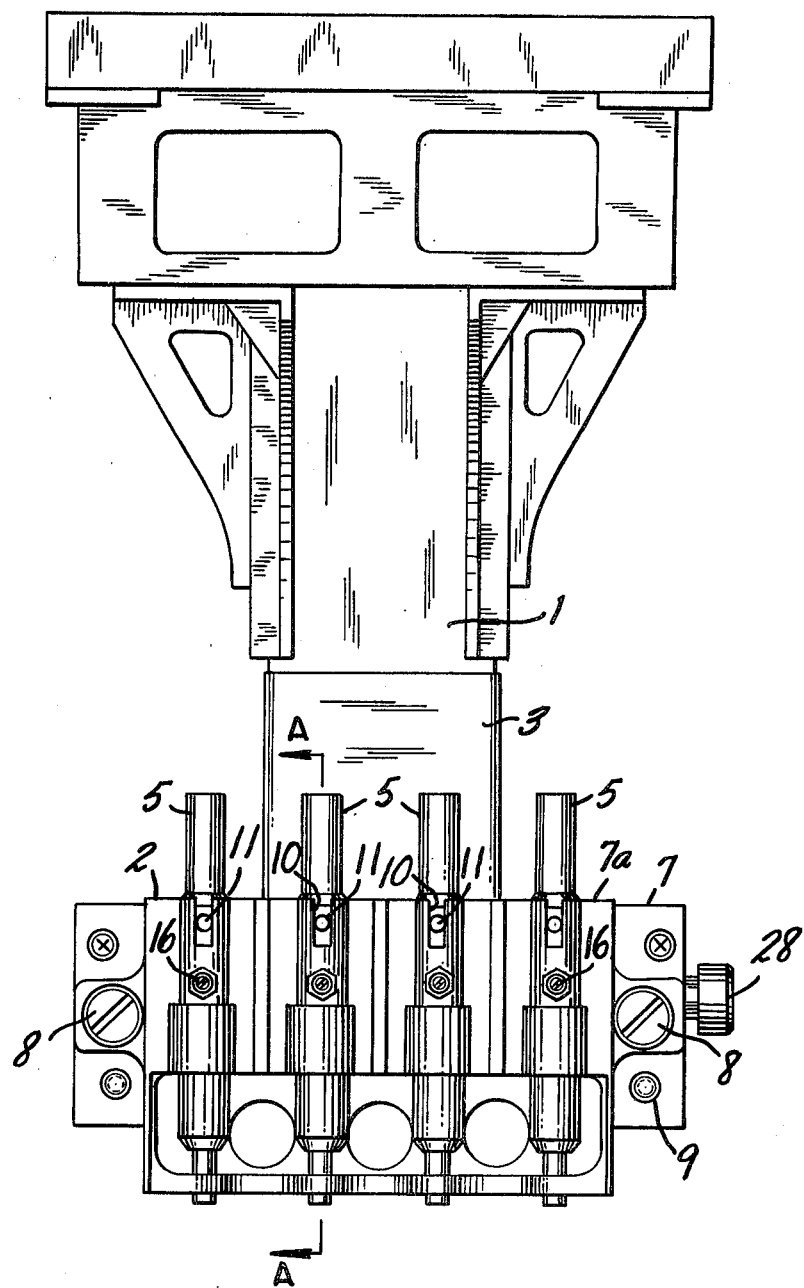
FIG. 1 is a front view showing the whole device.
Figure 2:
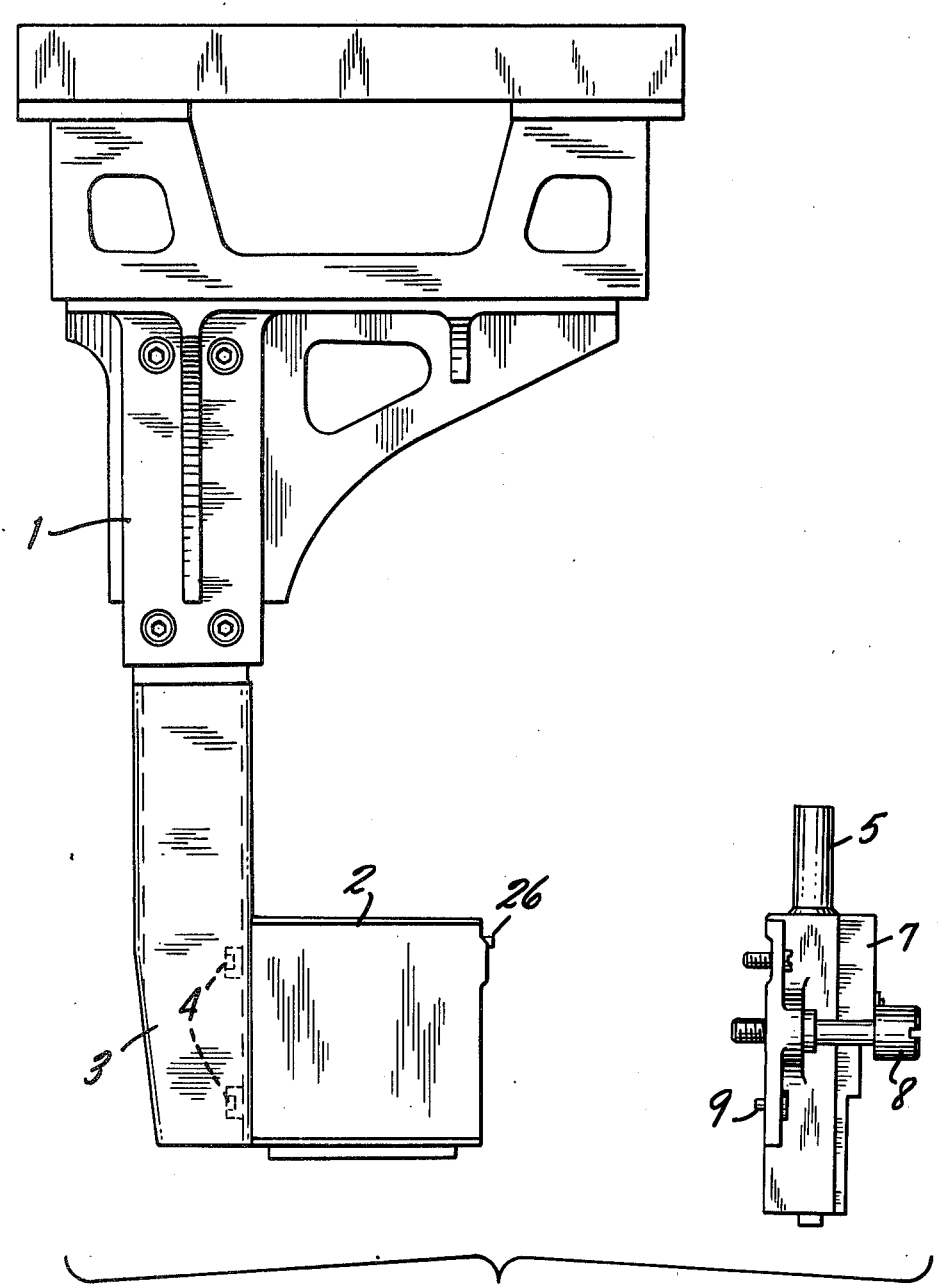
FIG. 2 is a side view of FIG. 1.

In FIGS. 1 and 2, numeral 1 designates a drafting head which moves along the sheet to be drawn under the control of a driving device such as a pulse motor, and numeral 2 designates a housing securely fixed to the drafting head frame 3 of the head 1 with bolts 4. Housing 2 is provided therein with an actuating means for pen shift and for pen exchange, which will be described later. Numeral 5 designates a plurality of pens for writing, milling or cutting, particularly in this embodiment, cutter pens respectively having blades 6 for cutting I.C. patterns. Numeral 7 designates a pen holder having a set of four housings 7a for accommodating therein cutter pens 5 in a row or in line, said pen holder 7 being fixed removable to said housing 2 by bolts 8. The positioning of this fixing is ensured in the manner that positioning pins 9 on the pen holder 7 respectively fit into fine-finished holes of housing 2 (not shown). Numeral 10 in FIG. 3 designates slots formed in the longitudinal direction of pens and arranged in different angular positions to each other by 45 degrees, in the top portion of housings 7a. Slots 10 serve to prevent pens from rotation and to set the blade directions, respectively receiving setting pins 11 which protrude from pens 5. Accordingly, blades 6 are different by 45 degrees in their direction when pens 5 are set in pen holder 7.

Numeral 12 designates a double-cylindrical stopper inserted in each housing 7a and forced upward by a spring 13, the shoulder 12b of stopper 12 being pressed to a sleeve 15 which is adjustably fixed to housing 7a with a screw 16 while the finer cylinder portion 12a of stopper 12 is engageable with a flange 14 of pen 5. Screw 16 has an eccentric pin portion 17 thereon inserted into a slit (not shown) of sleeve 15. Accordingly, turning screw 16, pin 17 shifts up or down to move sleeve 15 therewith. Numeral 18 is a lever provided corresponding to each pen and supported rotatable by a common shaft 19. Each lever 18 is forced in clockwise direction by a corresponding torsion spring 18a which surrounds shaft 19 and an end of lever 18 always contacts with the top of a plunger 21 of a corresponding electro-magnet 20. At the other end of lever 18, there is supported an actuating rod 22 slidable on lever 18 in the longitudinal direction (horizontal direction in FIG. 3). Rod 22 is forced forward by a spring 23 while a lug pin 24 is securely fixed to rod 22 and is slidably inserted through a slot of lever 18. Lug pin 24 serves as the stopper for rod 22 against the spring force.

The tip portion 26 of rod 22 is engageable with the upper flange 25 of pen 5. Numeral 27 designates a release lever fixed to a rotatable shaft 28. Release lever 27 is to engage with lug pin 24 to push it with the rotary motion thereof, withdrawing rod 22 into lever 18 against spring 23. The normal position of release lever 27 is shown in FIG. 3, as release lever 27 is forced to swing counterclockwise by a spring which is not shown and a pair of stoppers also not shown are provided to restrict its swivel angle.

Four sets of the actuating means each consisting of lever 18, rod 22, electro-magnet 20 and others are provided respectively corresponding to the housings 7a, for moving the corresponding pens 5 up and down.

In operation of the above mentioned pen holding device, pen setting is carried in a manner in which cutter pens 5 are respectively inserted into housings 7a of pen holder 7, setting pins 11 being set to just engage with slots 10. In this state, the lower face of upper flange 25 contacts with the top portion 26 so that the top portion 26 supports pen 5. Next, turning shaft 28 clockwise, all release levers 27 push stoppers 24 of rods 22 against springs 23 to thereby detach the top portions 26 of rods 22 from the flanges 25. As a result, pens 5 move down with their dead weights till the lower flanges 14 become in contact with double cylindrical stopper 12.

Figure 3:
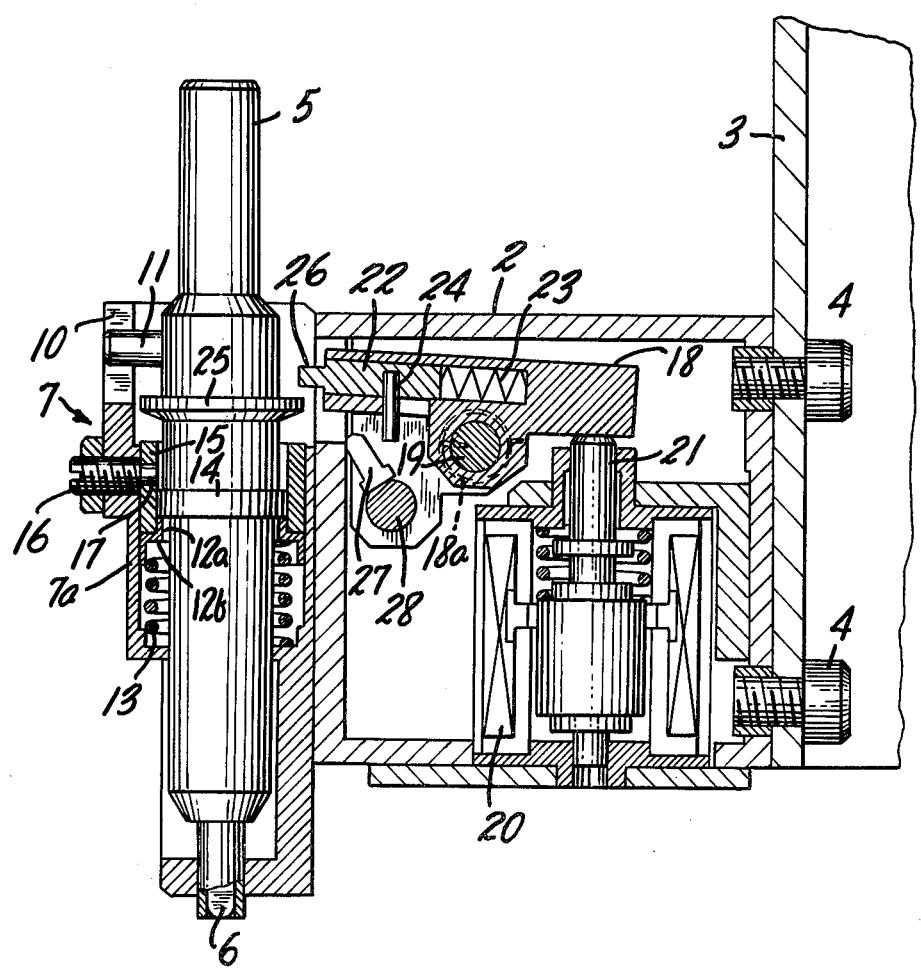
FIG. 3 is a sectional view taken on line A—A of FIG. 1.

Then, letting release levers 27 turn back with the spring force till the state of FIG. 3, rods 22 protrudes from levers 18 with the top portions 26 over upper flanges 25. Thus, a pen setting is completed. For drafting operation, one of the electro-magnets 20 is selectively energized to pull up plunger 21. Plunger 21 turns lever 18 counterclockwise and the top portion 26 of rod 22 then pushes upper flange 25 of pen 5 down against spring 13 through stopper 12. Thus, this pen is set to draft on the sheet in accordance with the drafting head travel along the sheet.

For resetting pen 5 from the drafting state, magnet 20 is deenergized and plunger 21 returns down. Lever 18 follows plunger 21 as it is always forced clockwise by spring force. Accordingly, pen 5 moves upward with the spring force of spring 13 till stopper shoulder 12 comes into contact with the lower end of sleeve 15. The upper mooring position of pen 5 may be adjusted by turning screw 16.

For releasing pens 5 from the holder, shaft 28 is turned clockwise to withdraw all rods 22 keeping the tip portions 26 away from the travel zones of upper flanges 25 of pens 5. Then, every pen 5 is ready for free pulling out from the holder.

What is claimed is:

1. A pen holding device for an automatic drafting device having a drafting head frame, said pen holding device comprising a plurality of pen holders arranged in a row and removably fixed to said frame, a plurality of pens slidably held in said pen holders respectively), said pens being slidable lengthwise between an operating position and a retracted position, spring means biasing said pens in one direction, actuating means for each of said pens respectively, each said actuating means being engageable with the respective pen for moving said pen between retracted position and operating position, and releasing means for simultaneously releasing all of said pens from said actuating means for removal of said pens from said pen holders.

2. A pen holding device according to claim 1, in which each of said actuating means comprises a lever, electromagnetic means for actuating said lever, retractable connecting means on said lever for engagement with the respective pen and means for biasing said connecting means into engagement with said respective pen, said releasing means being engageable with said connecting means of all of said actuating means to disengage said connecting means from all of said pens.

3. A pen holding device according to claim 2, in which said connecting means of each of said actuating means comprises a plunger slidably carried by said lever and said biasing means comprises a spring for biasing said plunger to a position in which it is engageable with the respective pen, said plunger having abutment means engageable by said releasing means to retract said plunger and thereby release said pen from said actuating means.

4. A pen holding device according to claim 3, in which said releasing means comprises a shaft, means for manually rotating said shaft and levers on said shaft engageable with said abutment means of said plungers of all of said actuating means.

* * * * *